United States Patent
Honya et al.

(10) Patent No.: US 7,345,624 B2
(45) Date of Patent: Mar. 18, 2008

(54) PULSE WAVE RADAR DEVICE

(75) Inventors: Tomohiro Honya, Tokyo (JP); Hiroshi Ikeda, Tokyo (JP)

(73) Assignee: TDK Corporation, Tokyo (JP)

( * ) Notice: Subject to any disclaimer, the term of this patent is extended or adjusted under 35 U.S.C. 154(b) by 8 days.

(21) Appl. No.: 11/375,264

(22) Filed: Mar. 15, 2006

(65) Prior Publication Data

US 2006/0170586 A1    Aug. 3, 2006

Related U.S. Application Data

(62) Division of application No. 11/245,125, filed on Oct. 7, 2005, now Pat. No. 7,053,819.

(30) Foreign Application Priority Data

Oct. 20, 2004    (JP)    ............... 2004-305658

(51) Int. Cl.
- *G01S 13/10* (2006.01)
- *G01S 7/292* (2006.01)
- *G01S 13/93* (2006.01)
- *G01S 13/00* (2006.01)

(52) U.S. Cl. ............... 342/134; 342/70; 342/118; 342/135; 342/159; 342/175; 342/195

(58) Field of Classification Search ......... 343/700 MS; 180/167–169; 342/27, 28, 70–72, 82–103, 342/118, 134–144, 159–165, 173–175, 189–197, 342/200–204; 701/300, 301

See application file for complete search history.

(56) References Cited

U.S. PATENT DOCUMENTS

| | | | |
|---|---|---|---|
| 3,623,095 A | 11/1971 | Gerardin et al. |
| 3,772,689 A | 11/1973 | Root, Jr. |
| 4,155,088 A | 5/1979 | Taylor, et al. |
| 4,206,463 A | 6/1980 | Glasgow |
| 4,308,535 A | 12/1981 | Guillerot et al. |
| 4,318,099 A | 3/1982 | Hsiao |
| 4,495,501 A | 1/1985 | Creed |
| 4,562,438 A | 12/1985 | Rouse et al. |
| 4,618,864 A | 10/1986 | Martin et al. |
| 4,654,665 A | 3/1987 | Kiuchi et al. |
| 4,712,109 A | 12/1987 | Galati et al. |

(Continued)

FOREIGN PATENT DOCUMENTS

EP    0 260 670    3/1988

(Continued)

*Primary Examiner*—Bernarr E. Gregory
(74) *Attorney, Agent, or Firm*—Oblon, Spivak, McClelland, Maier & Neustadt, P.C.

(57) ABSTRACT

To achieve a purpose of the present invention, a pulse wave radar device related to the present invention modulates a first transmitting pulse and a second transmitting pulse which are separated from each other by a predetermined lapse of time and transmits a transmitting pulse wave and, if a lapse of time from transmission of the transmitting pulse wave corresponding to the first transmitting pulse to outputting of a pulse by the receiving circuit is equal to a lapse of time from transmission of the transmitting pulse wave corresponding to the second transmitting pulse to outputting of a pulse by the receiving circuit, decides that the pulses are a receiving pulse reflected from a target.

4 Claims, 12 Drawing Sheets

U.S. PATENT DOCUMENTS

| | | |
|---|---|---|
| 4,835,536 A | 5/1989 | Piesinger et al. |
| 4,890,113 A | 12/1989 | Jacomini |
| 4,954,830 A | 9/1990 | Krikorian et al. |
| 5,870,054 A | 2/1999 | Lewis |
| 5,982,329 A | 11/1999 | Pittman et al. |
| 6,184,820 B1 | 2/2001 | Kratzer |
| 7,053,819 B2 * | 5/2006 | Honya et al. ............... 342/159 |

FOREIGN PATENT DOCUMENTS

| | | |
|---|---|---|
| GB | 1 310 343 | 3/1973 |
| GB | 1 427 164 | 3/1976 |
| JP | 61-079177 | 4/1986 |
| JP | 2000-275353 | 10/2000 |
| JP | 2003-302462 | 10/2003 |

* cited by examiner

Fig.6

| True/false of each comparison result | | | | | | | Target 2 | Target 1 | |
|---|---|---|---|---|---|---|---|---|---|
| (7) | (6) | (5) | (4) | (3) | (2) | (1) | | | |
| 0 | 0 | 0 | 0 | 0 | 0 | 0 | 0 | 0 | |
| 0 | 0 | 0 | 0 | 0 | 0 | 1 | 0 | M11 | |
| 0 | 0 | 0 | 0 | 0 | 1 | 0 | 0 | M21 | |
| 0 | 0 | 0 | 0 | 0 | 1 | 1 | M21 | M11 | |
| 0 | 0 | 0 | 0 | 1 | 0 | 0 | 0 | M31 | |
| 0 | 0 | 0 | 0 | 1 | 0 | 1 | M31 | M11 | ← Case 1 |
| 0 | 0 | 0 | 0 | 1 | 1 | 0 | M31 | M21 | |
| 0 | 0 | 0 | 0 | 1 | 1 | 1 | M21 | M11 | |
| 0 | 0 | 1 | 1 | 0 | 0 | 0 | 0 | M11 | |
| 0 | 0 | 1 | 1 | 1 | 0 | 0 | M31 | M11 | |
| 0 | 1 | 0 | 0 | 0 | 0 | 0 | 0 | M21 | |
| 0 | 1 | 0 | 1 | 0 | 0 | 1 | M21 | M11 | ← Case 2 |
| 1 | 0 | 0 | 0 | 1 | 0 | 0 | 0 | M21 | |
| 1 | 0 | 0 | 0 | 0 | 0 | 0 | M31 | M31 | |
| 1 | 1 | 0 | 0 | 0 | 0 | 0 | M31 | M21 | |

PULSE WAVE RADAR DEVICE

CROSS-REFERENCE TO RELATED APPLICATIONS

This application is a division of application Ser. No. 11/245,125, filed on Oct. 7, 2006, the entire contents of which is incorporated herein by reference, now U.S. Pat. No. 7,053,819.

BACKGROUND OF THE INVENTION

1. Field of the Invention

The present invention relates to a pulse wave radar device which uses a millimetric wave or a submillimetric wave. More specifically, it relates to a pulse wave radar device which reduces mistakes in decision owing to a noise.

2. Description of the Related Art

A pulse wave radar device is used which sends a pulse-modulated transmitting pulse wave and receives a receiving pulse wave reflected from a target, to calculate a distance to this target. Since a round-trip distance to a target can be obtained by integrating the light velocity with a lapse of time from a moment of sending transmitting pulse waves to a moment of receiving reflected waves from the target, the pulse wave radar device measures a lapse of time from a moment of sending a transmitting pulse to a moment of receiving a reflected wave from a target, to calculate a distance to the target.

In the pulse wave radar device, in detection of receiving pulse waves that are reflected from the target and come back to the pulse wave radar device, a threshold value is established so that a pulse larger than the threshold value may be decided to be a receiving pulse. If the threshold value is established high, noise resistance is improved but a faint pulse from a long distance cannot be detected. If the threshold value is established, low, on the other hand, a faint receiving pulse from a long distance can be detected but a noise contained in a received signal may possibly be detected as a receiving pulse. In the received signal, a lot of components are mixed such as a noise from a switching regulator used for a power A pulse wave radar device is disclosed which decides such a component to be a noise if its magnitude is larger than a theoretical maximum receiving intensity (see Japanese Patent Application Laid-open No. 2003-302462 for example). In this device, a maximum possible receiving pulse from the target is computed for each distance to the target so that a receiving pulse larger than this maximum possible receiving pulse from the target may be decided to be a noise.

SUMMARY OF THE INVENTION

Recently, a pulse wave radar device that utilizes an ISM band has been installed as a vehicle-installed radar or a wireless LAN or the like has been used in an open place. Such a situation has had a large influence on the pulse wave radar device. In particular, if the pulse wave radar device is used as a vehicle-installed radar, mutual transmitting pulse waves may possibly be mixed as periodic noises. Further, as described above, irregular noises from an electronic circuit may possibly be mixed.

The above-described conventional technology can remove a large one of these noises but not a noise having almost the same magnitude as that of a receiving pulse having an ordinary magnitude from a target, so that it is necessary to establish a noise deciding threshold value according to a distance.

It is an object of the present invention to provide a pulse wave radar device that can remove even such a noise as to have almost the same magnitude as that of a receiving pulse and by using a simple configuration.

To this end, in a pulse wave radar device related to the present invention, a transmitting circuit modulates at least two transmitting pulses and transmits them so that if lapses of time from transmission of these transmitting pulses to detection of them by a receiving circuit are equal to each other, the pulse detected by the receiving circuit may be decided to be a receiving pulse reflected from a target.

Specifically, a pulse wave radar device according to the present invention comprises: a transmitting circuit which modulates a first transmitting pulse and a second transmitting pulse which are separated in occurrence from each other by a predetermined time interval and transmitting a transmitting pulse wave;

a transmitting antenna for transmitting the transmitting pulse wave sent from the transmitting circuit;

a receiving antenna for receiving a receiving pulse wave reflected from a target; a receiving circuit for demodulating the receiving pulse wave from the receiving antenna and outputting a receiving pulse; and a time decision circuit for deciding that, if a lapse of time from transmission, by the transmitting circuit, of a transmitting pulse wave corresponding to the first transmitting pulse to outputting of a pulse by the receiving circuit is equal to a lapse of time from transmission, by the transmitting circuit, of a transmitting pulse wave corresponding to the second transmitting pulse to outputting of a pulse by the receiving circuit, the pulses are a receiving pulse reflected from the target.

According to the present invention, it is possible to calculate a round-trip propagation time or a distance to the target without mistakenly deciding that a pulse that has occurred due to a noise having an irregular period or a pulse having a different period from that of a pulse sent by the pulse wave radar device of the present invention is a receiving pulse reflected from the target.

In the pulse wave radar device of the present invention, if a difference between a lapse of time from transmission, by the transmitting circuit, of the transmitting pulse wave corresponding to the first transmitting pulse to outputting of the pulse by the receiving circuit and a lapse of time from transmission, by the transmitting circuit, of the transmitting pulse wave corresponding to the second transmitting pulse to outputting of the pulse by the receiving circuit falls in a preset range, preferably the time decision circuit may decide that these lapses of time are equal to each other.

According to the present invention, in a case where the pulse wave radar device of the present invention is installed in a vehicle or a pulse reflected from such a moving target as a vehicle is to be detected, even if a relative distance to the target changes each time a transmitting pulse wave is sent, it is possible to prevent a receiving pulse reflected from the target from being mistakenly decided to be a pulse that has occurred due to a noise.

In the pulse wave radar device of the present invention, each time the transmitting circuit transmits a transmitting pulse wave obtained by modulating the first and second transmitting pulses as one suite, preferably a time interval in occurrence between the first and second transmitting pulses is different.

Accordingly, it is possible to prevent a pulse that has occurred due to a periodic noise from being mistakenly decided to be a receiving pulse reflected from the target.

In the pulse wave radar device of the present invention, each time the transmitting circuit transmits a transmitting pulse wave obtained by modulating one suite of the first and second transmitting pulses and then transmits a transmitting pulse obtained by modulating the next one suite of the transmitting pulses, preferably a time interval between the transmission and the next transmission may be different.

Accordingly, it is possible to prevent a pulse that has occurred due to a periodic noise from being mistakenly decided to be a receiving pulse reflected from the target.

In the pulse wave radar device of the present invention, preferably the time interval between the transmission of the transmitting pulse wave obtained by modulating one suite of the first transmitting pulse and the second transmitting pulse and the transmission of the transmitting pulse wave obtained by modulating the next suite of the transmitting pulses may not be an integral multiple of a time interval in occurrence between the first and second transmitting pulses.

Accordingly, it is possible to prevent a pulse that has occurred due to a periodic noise from being mistakenly decided to be a receiving pulse reflected from the target.

In the pulse wave radar device of the present invention, preferably the time interval in which the transmitting circuit transmits a transmitting pulse wave may be longer than a round-trip propagation time that corresponds to a maximum detectable distance.

It is possible to receive even a receiving pulse which is generated by reflecting by a target at the maximum detectable distance without being interfered with by a receiving pulse reflected from a target at a short distance.

In the pulse wave radar device of the present invention, preferably the time decision circuit may be further provided with a distance calculation circuit for calculating a distance to a target based on a lapse of time from transmission by the transmitting circuit of a transmitting pulse wave, for a pulse decided by the time decision circuit to be a receiving pulse reflected from the target, to demodulation of a receiving pulse wave by the receiving circuit.

If the distance to the target is calculated based on also a pulse due to noises mistakenly decided to be a receiving pulse reflected from the target, signal processing may be troubled, so that the distance to the target is calculated based on a pulse decided to be a receiving pulse reflected from the target.

Another pulse wave radar device according to the present invention comprises:

a transmitting circuit which modulates a first transmitting pulse and a second transmitting pulse which are separated in occurrence from each other by a predetermined time interval and transmits a transmitting pulse wave;

a transmitting antenna which transmits the transmitting pulse wave sent from the transmitting circuit;

a receiving antenna which receives the receiving pulse wave reflected from a target; a receiving circuit which demodulates the receiving pulse wave from the receiving antenna and outputs a receiving pulse; and a time decision circuit which decides that, if it is decided by comparison that a lapse of time from transmission, by the transmitting circuit, of a transmitting pulse wave corresponding to the first transmitting pulse to outputting of a pulse by the receiving circuit is not equal to a lapse of time from transmission, by the transmitting circuit, of a transmitting pulse wave corresponding to the second transmitting pulse to outputting of a pulse by the receiving circuit, the receiving pulse is a noise.

According to the present invention, if the lapses of time from modulation of at least two transmitting pulses and transmission of transmitting pulse waves by the transmitting circuit to detection of pulses by the receiving circuit do not agree, the pulse is decided to be a noise, so that it is possible to prevent mistaken decision by removing pulses that have occurred due to noises from pulses to be measured.

According to the present invention, it is possible to calculate a round-trip propagation time or a distance to the target without mistakenly deciding that a pulse that has occurred due to a noise having an irregular period or a pulse having a different period is a receiving pulse reflected from the target.

BRIEF DESCRIPTION OF THE DRAWINGS

FIG. 6 is a table explaining a form of operations of the time decision circuit applied to the pulse wave radar device according to the present invention;

DESCRIPTION OF THE PREFERRED EMBODIMENTS

The following will describe embodiments explaining the present invention with reference to drawings. However, the present invention is not limited to the following embodiments.

Figure 1:
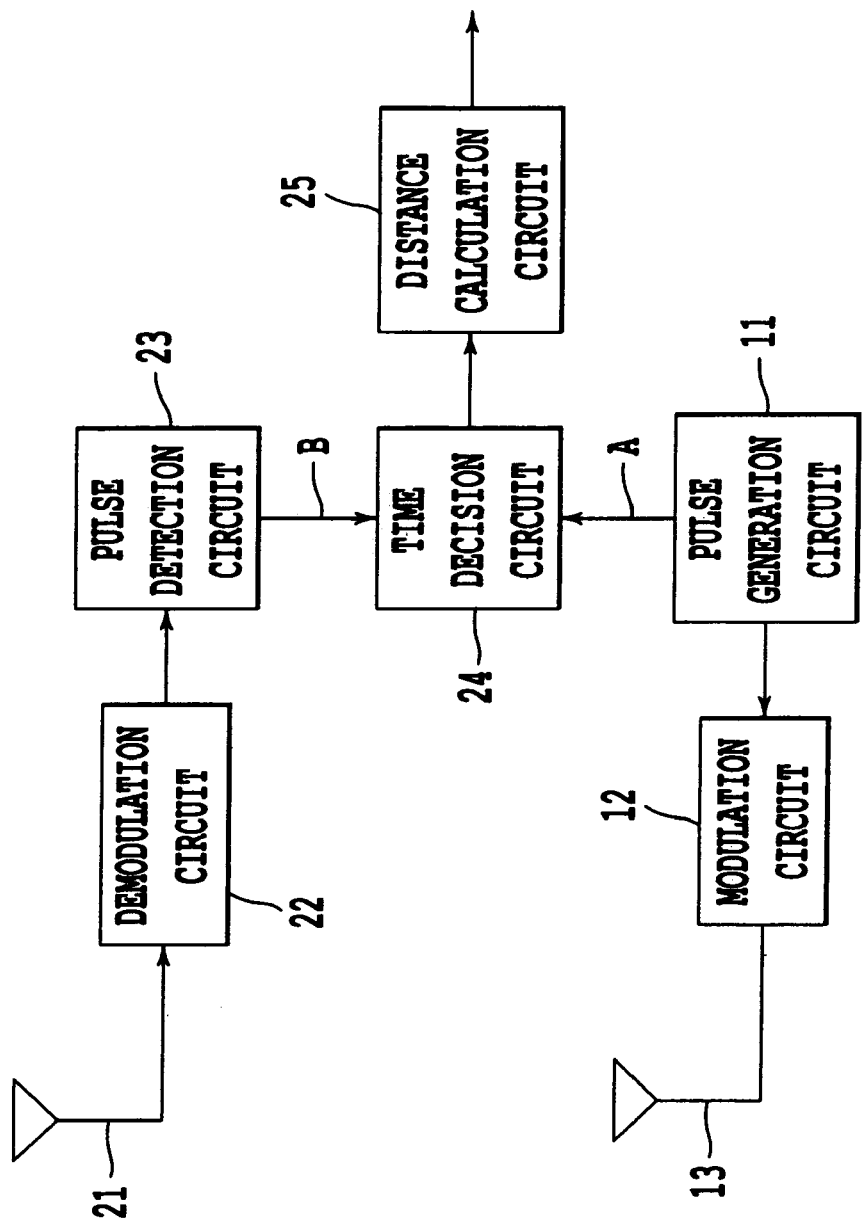
FIG. 1 is a block diagram explaining one example of an embodiment of a pulse wave radar device according to the present invention.

FIG. 1 is a block diagram of one example of an embodiment of a pulse wave radar device related to the present invention. In FIG. 1, a number 11 indicates a pulse generation circuit for outputting a first transmitting pulse and a second transmitting pulse which are separated from each other by a predetermined time interval, a number 12 indicates a modulation circuit for modulating the transmitting pulses and sending a transmitting pulse wave, a number 13 indicates a transmitting antenna for transmitting the transmitting pulse wave, a number 21 indicates a receiving antenna for receiving the receiving pulse wave reflected from a target, a number 22 indicates a demodulation circuit for demodulating the receiving pulse wave, a number 23 indicates a pulse detection circuit for detecting a receiving pulse, a number 24 indicates a time decision circuit for deciding that the receiving pulse is reflected from the target if the receiving pulse is detected twice successively at the same time position, and a number 25 indicates a distance calculation circuit for calculating a distance to the target based on a round-trip propagation time thereto. The time decision circuit 24 may be included in the distance calculation circuit 25.

A transmitting circuit includes the pulse generation circuit 11 and the modulation circuit 12. A receiving circuit includes the demodulation circuit 22 and the pulse detection circuit 23.

First, a configuration of a transmission system of the pulse wave radar device is described with reference to FIG. 1. The pulse generation circuit 11 outputs a first transmitting pulse and a second transmitting pulse which are separated from each other by a predetermined time interval. It may output one suite of the first and second transmitting pulses and the next one suite of them in sequence. Preferably the predetermined time interval may be set longer than a round-trip propagation time of radio waves that corresponds to a maximum detectable distance of the present pulse wave radar device. Further, a time interval from outputting of the second transmitting pulse to that of the first transmitting pulse of the next suite may also preferably be set longer than the round-trip propagation time of radio waves that corresponds to the maximum detectable distance of the present pulse wave radar device.

The modulation circuit 12 modulates the transmitting pulse from the pulse generation circuit 11 and sends a transmitting pulse wave. The transmitting antenna 13 is used to transmit the transmitting pulse wave sent from the modulation circuit 12. The transmitting antenna 13 may be composed of a plurality of antennas.

Next, a configuration of a reception system of the pulse wave radar device is described. The receiving antenna 21 receives a receiving pulse wave reflected from a target. The receiving antenna 21 may also be composed of a plurality of antennas. Further, it may serve as both the transmission and receiving antennas. The demodulation circuit 22 detects the receiving pulse wave by using an oscillation wave having a frequency used in the pulse wave radar device, to demodulate a receiving pulse from this receiving pulse wave. The pulse detection circuit 23 detects the receiving pulse output from the demodulation circuit 22 compared it to a predetermined threshold value and outputs it as a receiving pulse.

The time decision circuit 24 compares to each other a lapse of time from outputting of the first transmitting pulse by the pulse generation circuit 11 to outputting of the pulse by the pulse detection circuit 23 and a lapse of time from outputting of the second transmitting pulse by the pulse generation circuit 11 to outputting of the pulse by the pulse detection circuit 23 and, if they are equal to each other, decides that this pulse is the receiving pulse reflected from the target. It is to be noted that "to be equal" as used herein may preferably include a case where a difference between the two lapses of time fall in a predetermined range.

The time decision circuit 24 outputs a lapse of time from transmission by the pulse generation circuit 11 of the first transmitting pulse, for a pulse decided to be a receiving pulse reflected from the target, to detection of the pulse by the pulse detection circuit 23 or a lapse of time from outputting of the second transmitting pulse by the pulse generation circuit 11 to outputting of the pulse by the pulse detection circuit 23, as a round-trip propagation time of radio waves from the pulse wave radar device to the target. That is, if the lapses of time do not correspond as a result of comparison, the time decision circuit 24 decides the receiving pulse to be a noise and so avoids outputting the lapses of time as the round-trip propagation time of radio waves.

For the pulse decided by the time decision circuit 24 to be the receiving pulse reflected from the target, the distance calculation circuit 25 integrates (the light velocity/2) with the round-trip propagation time, to calculate the distance to the target. In FIG. 1, it is a difference in time between a timing when the pulse generation circuit 11 outputs the transmitting pulse and a timing when the pulse detection circuit 23 detects the receiving pulse. It is preferable to measure delay times through the pulse generation circuit 11, the modulation circuit 12, the transmitting antenna 13, the receiving antenna 21, the demodulation circuit 22, and the pulse detection circuit 23 beforehand so that the time decision circuit 24 may subtract these delay times measured beforehand from the difference in time to provide, by compensation, a round-trip propagation time to the target that is a lapse of time from transmission of the transmitting pulse wave by the transmitting antenna to reception of the receiving pulse wave by the receiving antenna. Alternatively, the distance calculation circuit 25 may subtract the delay times from a measured round-trip propagation time to calculate a distance to the target.

Figure 2:
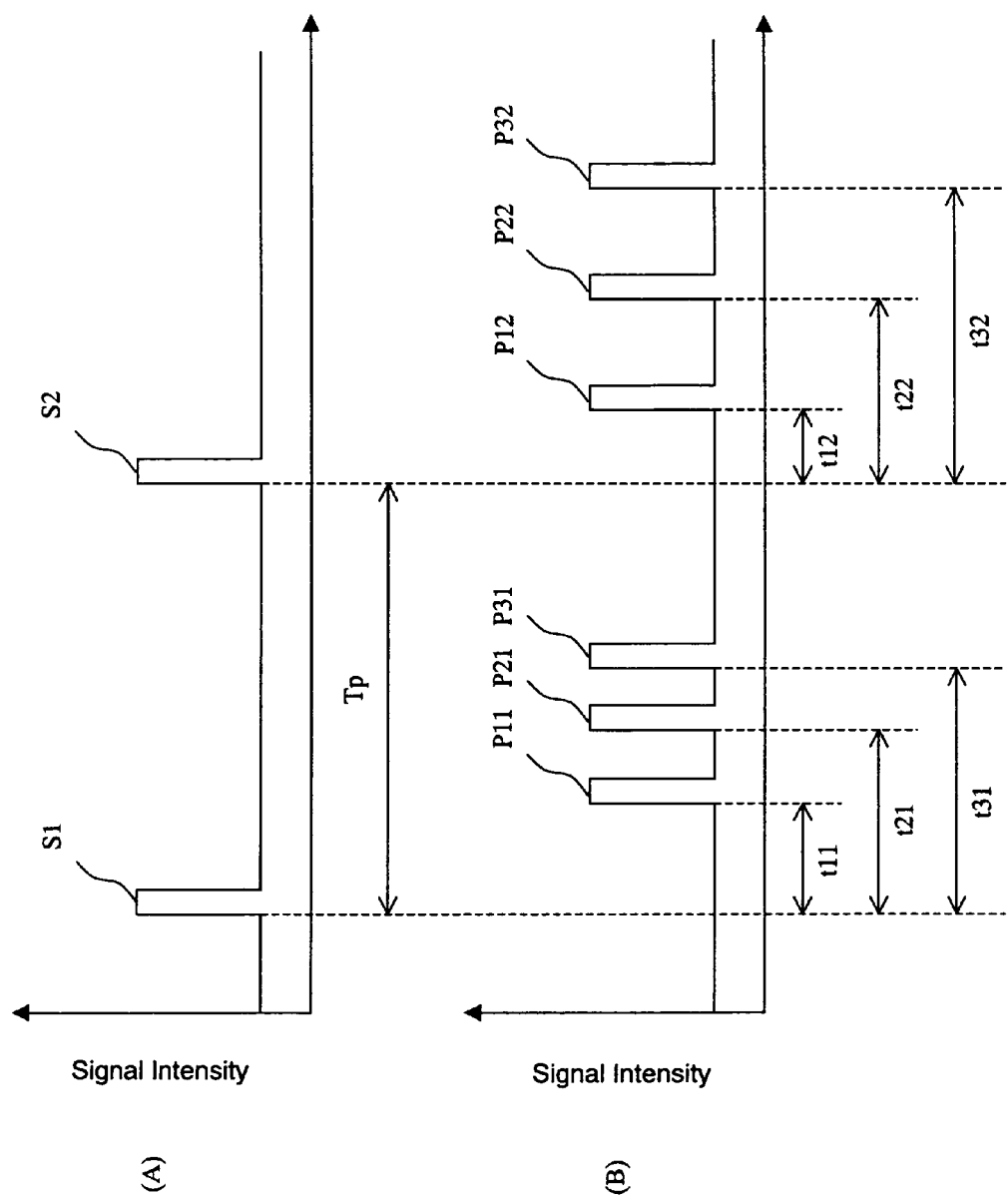
FIG. 2 is a timing chart explaining operations of the pulse wave radar device according to the present invention.

The following will describe operations of the pulse wave radar device shown in FIG. 1 with reference to FIG. 2. In the description, the reference symbols in FIG. 1 are used properly. FIG. 2A shows an operating wave-shape at point A in FIG. 1 and FIG. 2B shows that at point B in FIG. 1. S1 indicates a pulse synchronized with a first transmitting pulse output by the pulse generation circuit 11 and S2 indicates a pulse synchronized with a second transmitting pulse output by the pulse generation circuit 11. P11, P21, and P31 respectively indicate pulses output by the pulse detection circuit 23 after pulse S1 is output and P12, P22, and P32 respectively indicate pulses output by the pulse detection circuit 23 after pulse S2 is output.

Preferably a time interval Tp between pulses S1 and S2 may be longer than a round-trip propagation time that corresponds to a maximum detectable distance. With this, a receiving pulse from a target at the maximum detectable distance can be received without being interfered with by a receiving pulse from a target at a short distance. The maximum detectable distance refers to such a maximum possible distance that the pulse wave radar device can detect a receiving pulse wave at this distance.

In the case of outputting a plurality of suites of transmitting pulses each of which combines the first transmitting pulse and the second transmitting pulse, preferably a time interval between pulse S2 and the next pulse S1 may be longer than a round-trip propagation time that corresponds to the maximum possible distance.

The time decision circuit 24 compares time interval t11 from pulses S1 to P11, time interval t21 from pulses S1 to P21, and time interval t31 from pulses S1 to P31 to time interval t12 from pulses S2 to P12, time interval t22 from pulses S2 to P22, and time interval t32 from pulses S2 to P32 respectively. If $t11 \neq t12$, $t21=t22$, and $t31 \neq t32$, it decides that pulses P21 and P22 are the receiving pulses reflected from the target. If they are the receiving pulses reflected from the target, the target is at a constant distance from the pulse wave radar device, so that it is detected in a constant lapse of time after the pulses S1 and S2 are output.

Figure 3:
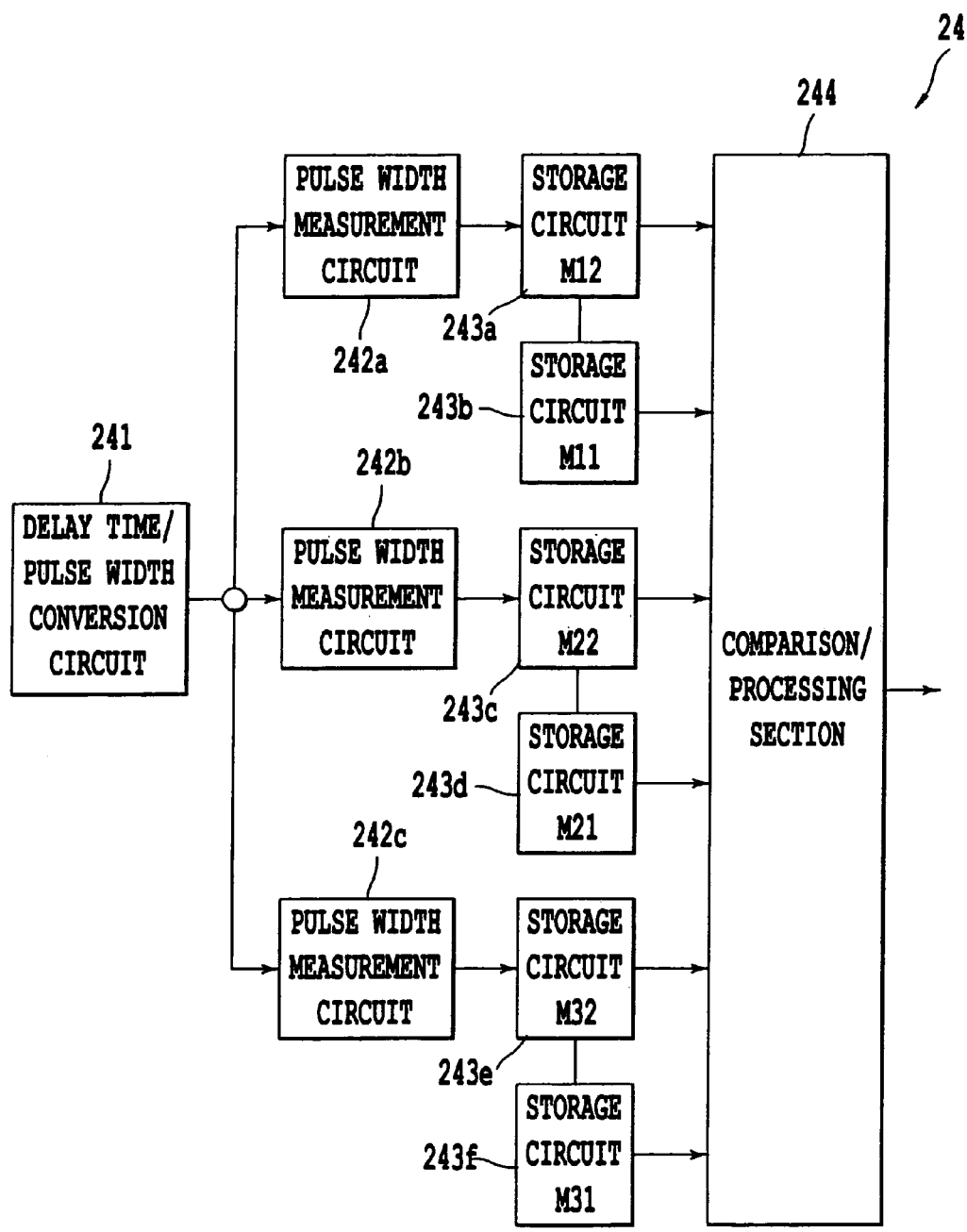
FIG. 3 is a block diagram explaining a time decision circuit in the pulse wave radar device according to the present invention.

A configuration example of the time decision circuit 24 is shown in FIG. 3. In FIG. 3, a number 24 indicates the time decision circuit, a number 241 indicates a delay time/pulse width conversion circuit, numbers 242a, 242b, and 242c indicate a pulse width measurement circuit, numbers 243a, 243b, 243c, 243d, 243e, and 243f indicate a storage circuit, and a number 244 indicates a comparison/processing section. M12, M22, M32, M11, M21, and M31 represent contents stored in the storage circuits 243a-243f respectively. Following will be described using symbols FIGS. 1 and 2 as need.

The delay time/pulse width conversion circuit 241 converts into a pulse width a delay time of a pulse from the pulse detection circuit 23 with respect to a pulse from the pulse generation circuit 11. Such a function can be realized by, for example, a set/reset type flip-flop circuit that receives a pulse from the pulse generation circuit 11 as a set input and a pulse from the pulse detection circuit 23 as a reset input. The set/reset type flip-flop circuit outputs a signal having a large pulse width if a lapse which of time from a timing which the pulse generation circuit 11 outputs a transmitting pulse to a timing which the pulse detection circuit 23 outputs a receiving pulse is long and a signal having a small pulse width if that lapse of time is short.

The pulse width measurement circuits 242a, 242b, and 242c measure pulse widths that correspond to delay times from pulse S1 to pulses P11, P21, and P31 respectively or pulse widths that correspond to delay times from pulse S2 to pulses P12, P22, and P32 respectively. First, a pulse width that corresponds to delay time t11 from pulses S1 to P11 is stored as M12 in the storage circuit 243a and a pulse width that corresponds to that delay time t11 is shifted as M11 to the storage circuit 243b. Next, a pulse width that corresponds to delay time t12 from pulses S2 to P12 is stored as M12 in the storage circuit 243a.

Similarly, pulse widths that correspond to delay times t21 and t22 are stored as M22 and M21 in the storage circuits 243c and 243d respectively, while pulse widths that correspond to delay times t31 and t32 are stored as M32 and M31 in the storage circuits 243e and 243f respectively.

The comparison/processing section 244 compares a pulse width corresponds to delay time t11 to a pulse width corresponding to delay time t12 and, if they are equal to each other, decides that pulse P11 is a receiving pulse reflected from the target. Similarly, it compares a pulse width corresponds to delay time t21 to a pulse width corresponding to delay time t22 and also a pulse width corresponding to delay time t31 to a pulse width corresponding to delay time t32 for decision.

Figure 4:
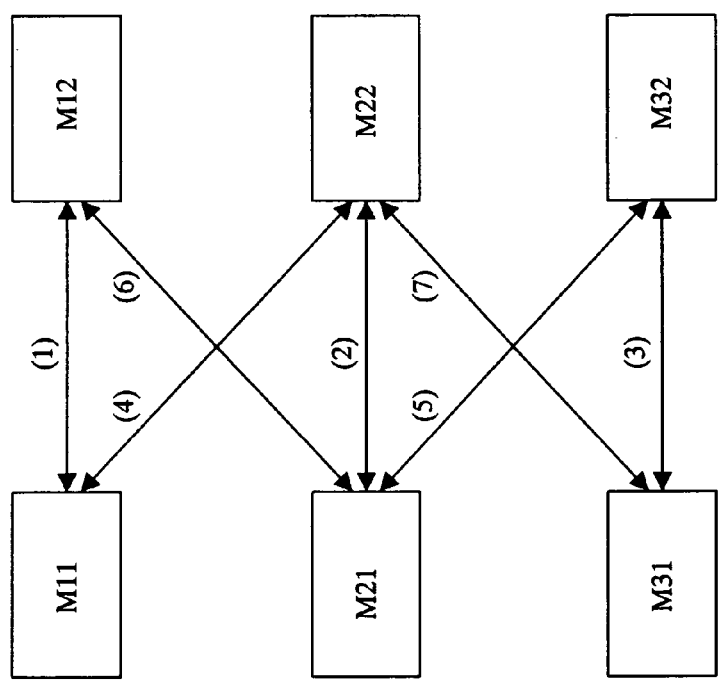
FIG. 4 is an explanatory illustration of operations of the time decision circuit applied to the pulse wave radar device according to the present invention.

However, there is a possibility that a receiving pulse reflected from the original target may not be detected or a pulse that has occurred due to a noise may be mistakenly decided to be a receiving pulse reflected from the target. To solve this problem, it is necessary to perform cross check on pulse widths as shown in FIG. 4. In FIG. 4, M12, M22, M32, M11, M21, and M31 represent contents stored in the storage circuits 243a to 243f in FIG. 3 respectively. For example, in the case of detecting up to three pulses, comparisons for a total of seven types are performed not only of comparisons (1), (2), and (3) over the sequential pulse widths but also of comparisons (4)-(7) over the nonsequential pulse widths.

Figure 5:
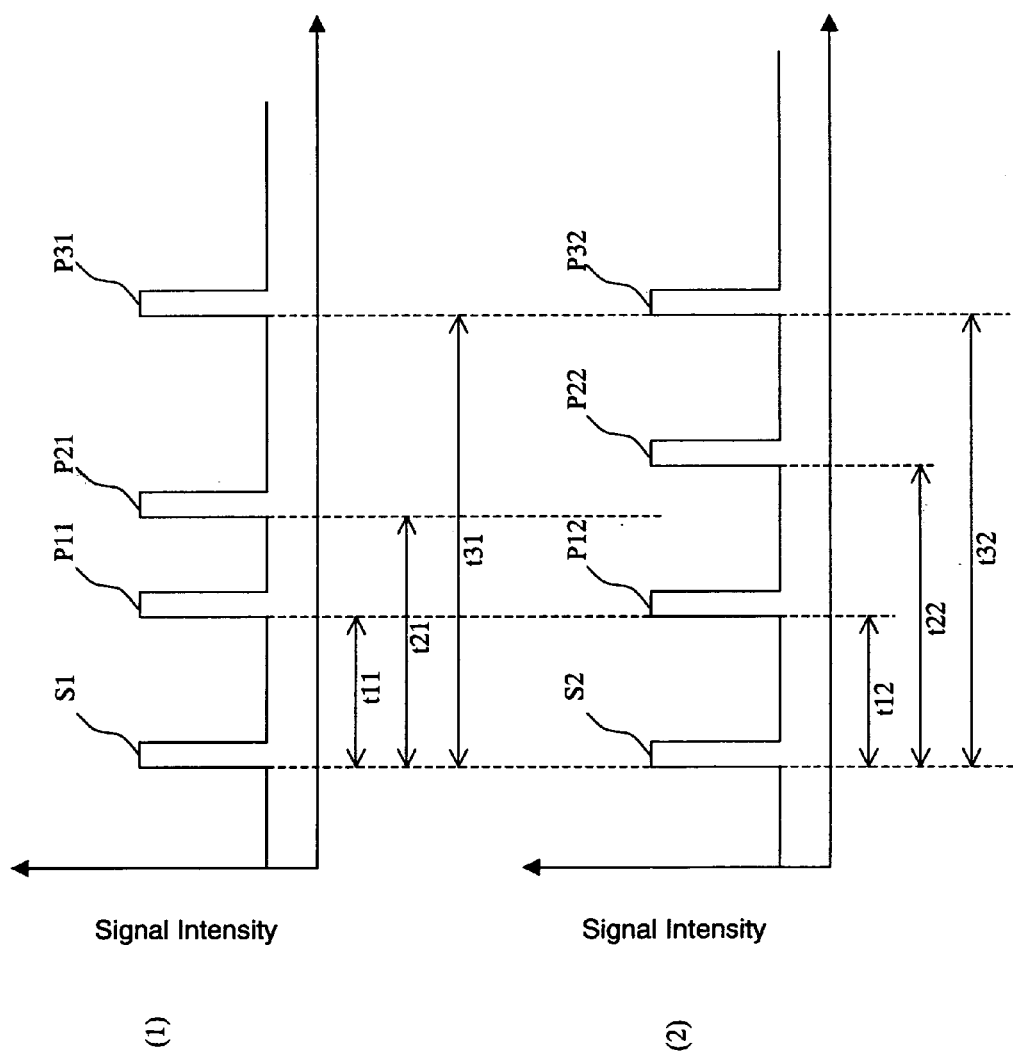
FIG. 5 is a timing chart explaining operations of the pulse wave radar device according to the present invention.

An example of the comparison is described as follows with reference to FIG. 5. (1) in FIG. 5 shows a delay time with respect to pulse S1 and (2) in FIG. 5 shows a delay time with respect to pulse S2. In (1) in FIG. 5, in delay times t11, t21, and t31 after pulse S1 occurs, pulses P11, P21, and P31 are detected respectively. In (2) in FIG. 5, in delay times t12, t22, and t32 after pulse S2 occurs, pulses P12, P22, and P32 are detected respectively. In this example, since delay times t11=t12 and delay times t31=t32, pulses P11, P12, P31, and P32 are decided to be a receiving pulse reflected from the target, finding that there are the targets at positions that correspond to round-trip propagation times of t11 and t31 respectively.

Combinations for comparing the respective delay times based on a comparison approach of FIG. 4 are shown in FIG. 6. As shown in FIG. 4, comparisons for seven type are performed. If results of the comparisons are represented by true-or-false, $2^7$=128 combinations are provided for these seven combinations; however, if up to two targets are given and the pulse detection circuit 23 outputs up to three pulses, 18 combinations such as shown in FIG. 6 may be valid. In FIG. 6, "TRUE" is represented by "1" and "FALSE", by "0". Columns (1) through (7) represent combinations for the comparisons shown in FIG. 4.

A case shown in FIG. 5 corresponds to a combination indicated by "Case 1" in FIG. 6. That is, only comparisons of (1) and (3) shown in FIG. 4 are true and the others are false. As a result, a delay time of storage contents M11 is assigned to target 1 and that of storage contents M31, to target 2.

Figure 7:
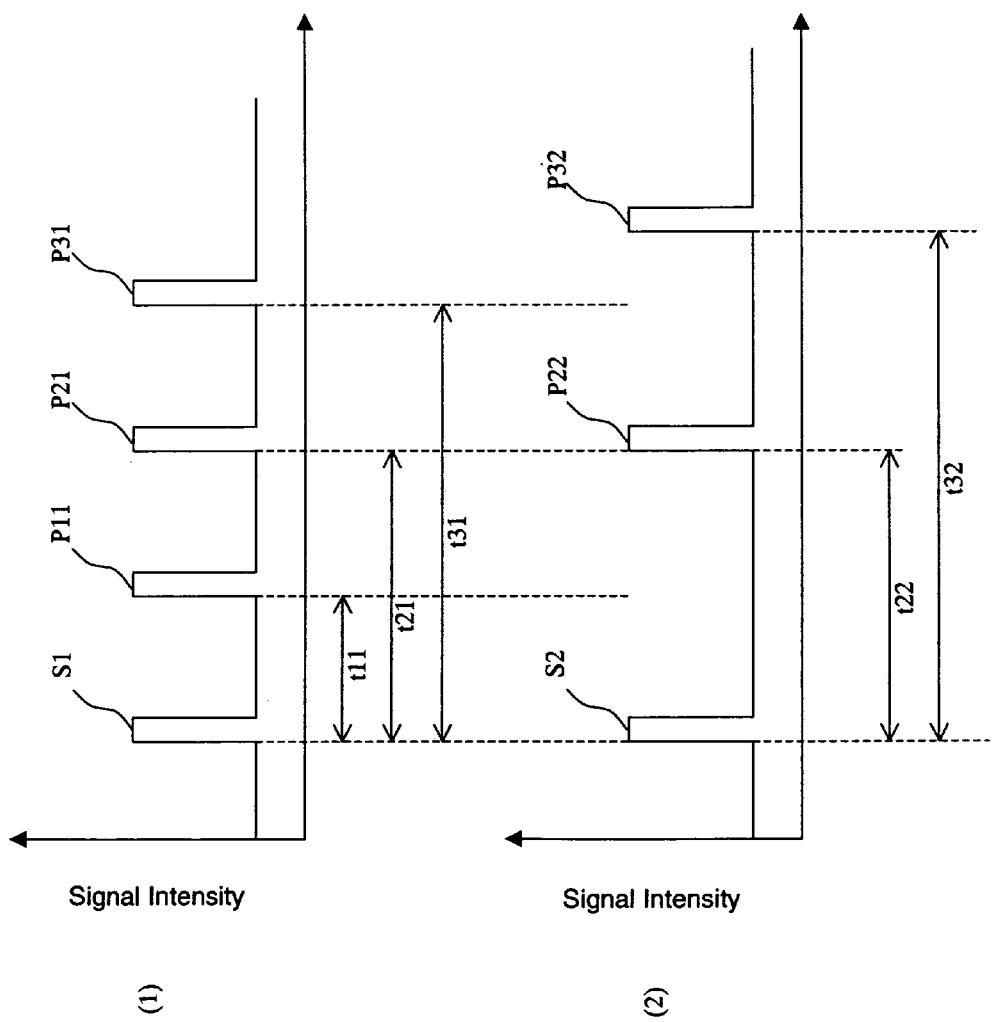
FIG. 7 is a timing chart explaining operations of the pulse wave radar device according to the present invention.

The other comparison examples are described with reference to FIG. 7. (1) in FIG. 7 shows a delay time with respect to pulse S1 and (2) in FIG. 7 shows a delay time with respect to pulse S2. In (1) in FIG. 7, in delay times t11, t21, and t31 after pulse S1 occurs, pulses P11, P21, and P31 are detected respectively. In (2) in FIG. 7, in delay times t22 and t32 after pulse S2 occurs, pulses P22 and P32 are detected respectively. In this example, since delay times t21=t22, pulses P21 and P22 are decided to be a receiving pulse reflected from the target, finding that there is the target at a position that corresponds to a round-trip propagation time of t21 or t22.

A case shown in FIG. 7 corresponds to a combination indicated by "Case 2" in FIG. 6. That is, only a comparison of (6) shown in FIG. 4 is true and the others are false. As a result, a delay time of storage contents M21 is assigned to target 1 and no delay time is assigned to target 2.

Figure 8:
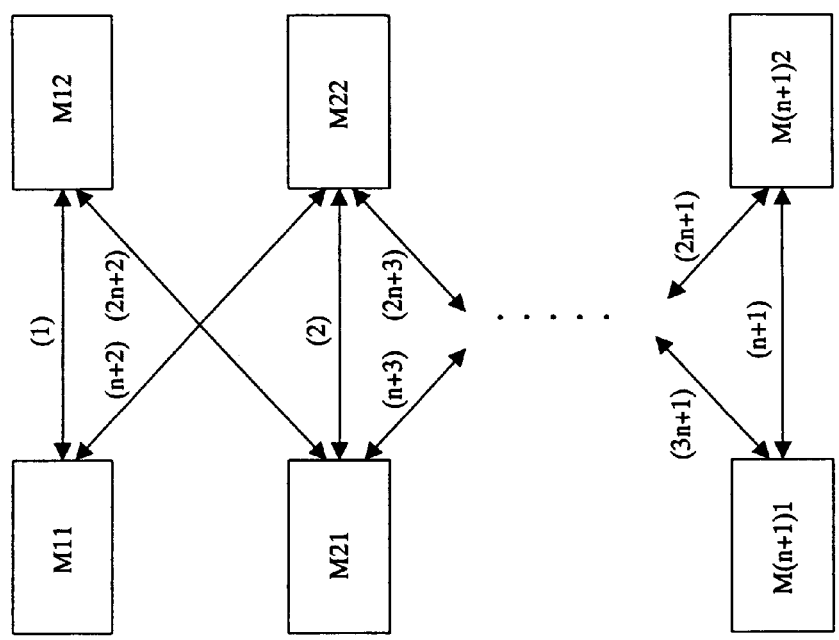
FIG. 8 is an explanatory illustration of operations of the time decision circuit applied to the pulse wave radar device related to the present invention.

Although FIGS. 4 to 7 have been used to describe the example where there are two targets and three pulses to be detected, if there are up to n number of targets and (n+1) number of pulses to be detected, it is necessary to have 2×(n+1) number of storage regions. A comparison method is shown in FIG. 8. In FIG. 8, there are storage regions M11 through M(n+1)1 to store a delay time with respect to pulse S1 and storage regions M12 through M(n+1)2 to store a delay time with respect to pulse S2. By comparing these by using such a truth-false table as shown in FIG. 6, it is possible to prevent a mistake in decision owing to a noise.

According to the above-described pulse wave radar device of the present invention, it is possible to calculate a round-trip propagation time or a distance to a target without mistakenly deciding a pulse due to a noise having an irregular period or a pulse having a different period from that of a pulse transmitted from the pulse wave radar device of the present invention, to be a receiving pulse reflected from the target.

In a case where the pulse wave radar device of the present invention is installed in a vehicle or a moving vehicle is measured using the pulse wave radar device of the present invention, if a relative distance changes in a lapse of time from modulation of a first transmitting pulse and transmission of a transmitting pulse wave to modulation of a second transmitting pulse and transmission of a transmitting pulse wave, the round-trip propagation time to the target changes, so that it is impossible to decide whether the receiving pulse is reflected from the target.

To prevent such a mistake in decision, if a difference between a lapse of time from transmission, by the transmitting circuit, of a transmitting pulse wave corresponding to a first transmitting pulse to outputting of a pulse by the receiving circuit and a lapse of time from transmission, by the transmitting circuit, of a transmitting pulse wave corresponding to a second transmitting pulse to outputting of a pulse by the receiving circuit falls in a preset range, preferably the time decision circuit may regard these two lapses of time as being equal to each other, to decide that the pulse is a receiving pulse reflected from the target.

Figure 9:
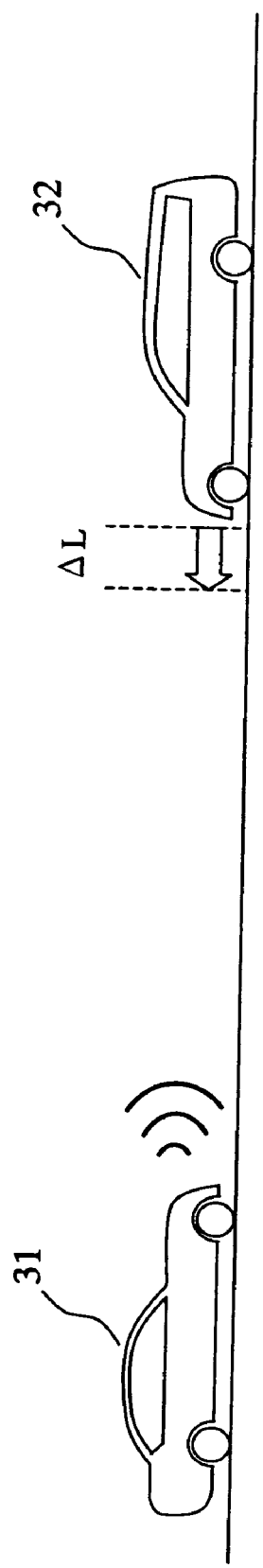
FIG. 9 is an explanatory illustration of an example where the pulse wave radar device is installed in a vehicle.

For example, as shown in FIG. 9, it is supposed that a relative speed between a vehicle 31 and a vehicle 32 is 100 m/s (360 km/h) and a lapse of time from transmission of a transmitting pulse wave corresponding to a first transmitting pulse to transmission of a transmitting pulse wave corresponding to a second transmitting pulse by the transmitting circuit is 0.5 ms. Then, the relative distance between the vehicle 31 mounted with the pulse wave radar device of the present invention and the target vehicle 32 is reduced by ΔL=5 cm in 0.5 ms.

In a case where the preset range is assumed to be 0.33 ns, which is a propagation time over 2×ΔL (=10 cm), even with a moving object with a relative speed of 100 m/s, if a difference is 0.33 ns or less between a lapse of time from transmission, by the transmitting circuit, of a transmitting pulse wave corresponding to a first transmitting pulse to outputting, by the receiving circuit, of a pulse reflected from the vehicle yet to move and a lapse of time from transmission, by the transmitting circuit, of a transmitting pulse wave corresponding to a second transmitting pulse to outputting, by the receiving circuit, of a pulse reflected from the moving vehicle, the time decision circuit decides that the pulse is a receiving pulse reflected from the target.

If the pulse wave radar device is installed in a lot of vehicles, a transmitting pulse wave transmitted from the pulse wave radar device in any other vehicle is received as a noise. It is effective if each time the transmitting circuit transmits a transmitting pulse wave obtained by modulating first and second transmitting pulses as one suite to the pulse wave radar device periodically transmitting a transmitting pulse wave in any other vehicle so that a time interval in occurrence between the first and second transmitting pulses is different.

Figure 10:
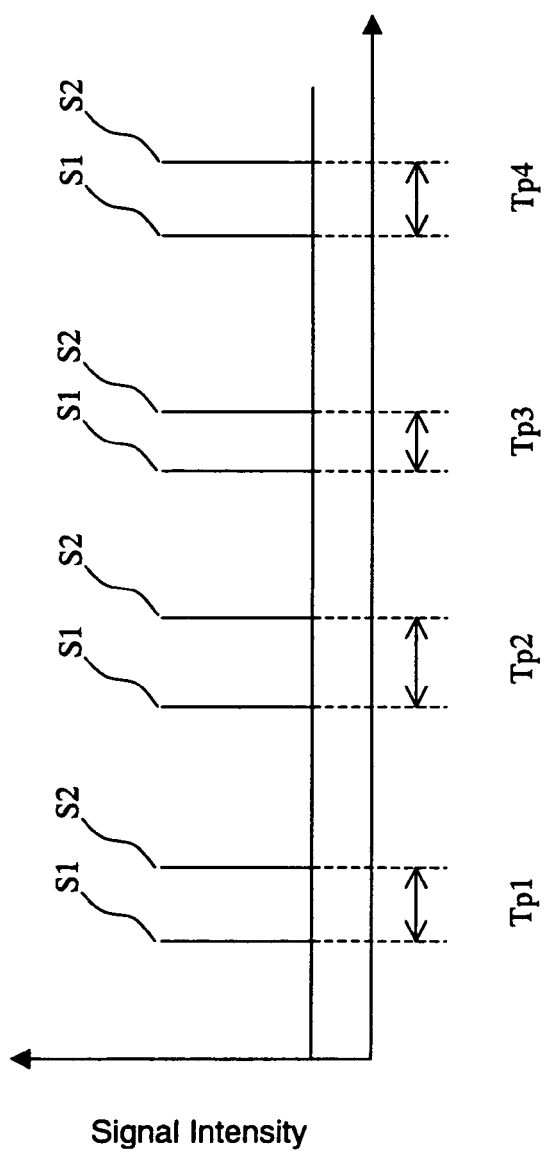
FIG. 10 is a timing chart of the pulse wave radar device related to the present invention.

FIG. 10 shows an example where each time a transmitting pulse wave obtained by modulating one suite of a first transmitting pulse and a second transmitting pulse is transmitted so that a time interval in occurrence between the first and second transmitting pulses is different. Tp1 represents a time interval between first transmitting pulse S1 and second transmitting pulse S2 of a first suite, Tp2 represents a time interval between first transmitting pulse S1 and second transmitting pulse S2 of a second suite, Tp3 represents a time interval between first transmitting pulse S1 and second transmitting pulse S2 of a third suite, and Tp4 represents a time interval between first transmitting pulse S1 and second transmitting pulse S2 of a fourth suite. If the time interval is different at least between the time-wise adjacent suites, it is possible to prevent mistakenly deciding, twice in a row, a pulse due to a noise to be a receiving pulse reflected from the target. Preferably, the time intervals may be different from each other.

If there is a target ahead of the pulse wave radar device of the present invention, a receiving pulse reflected from the target is detected when a constant lapse of time elapses after a transmitting pulse wave obtained by modulating a first transmitting pulse of a first suite is transmitted and another receiving pulse reflected from the target is received when the same lapse of time elapses after transmission of a transmitting pulse wave obtained by modulating a second transmitting pulse of the first suite. Further, a receiving pulse reflected from the target is detected when the same lapse of time elapses after a transmitting pulse wave obtained by modulating a first transmitting pulse of a second suite is transmitted and another receiving pulse reflected from the target is received when the same lapse of time elapses after transmission of a transmitting pulse wave obtained by modulating a second transmitting pulse of the second suite.

While on the other hand, if the pulse wave radar device in any other vehicle transmits pulse waves at an interval of Tp1, a pulse from the pulse wave radar device in this other vehicle is detected when the same lapse of time elapses after transmission of a transmitting pulse wave obtained by modulating the first transmitting pulse of the first suite and after transmission of a transmitting pulse wave obtained by modulating the second transmitting pulse of the first suite. However, even if the pulse is detected from this other vehicle when the same lapse of time elapses after transmission of a transmitting pulse obtained by modulating a first transmitting pulse of the second suite, the pulse from the pulse wave radar device in this other vehicle is detected when a different lapse of time elapses after transmission of a transmitting pulse wave obtained by modulating a second transmitting pulse of the second suite. As a result, it is possible to decide this pulse to be a pulse due to a noise, thereby preventing mistakenly deciding that it is a receiving pulse reflected from the target.

In this case, preferably a rule of majority based on a plurality of decision results may be employed or a round-trip propagation time or distance to the target may be output if the pulse is successively decided to be a receiving pulse reflected from the target.

As another countermeasure against the pulse wave radar device in any other vehicle transmitting a transmitting pulse wave periodically, it is effective to make different each lapse of time from a moment when the transmitting circuit transmits a transmitting pulse wave obtained by modulating one suite of a first transmitting pulse and a second transmitting pulse to a moment when it transmits a transmitting pulse wave obtained by modulating the next suite of transmitting pulses.

Figure 11:
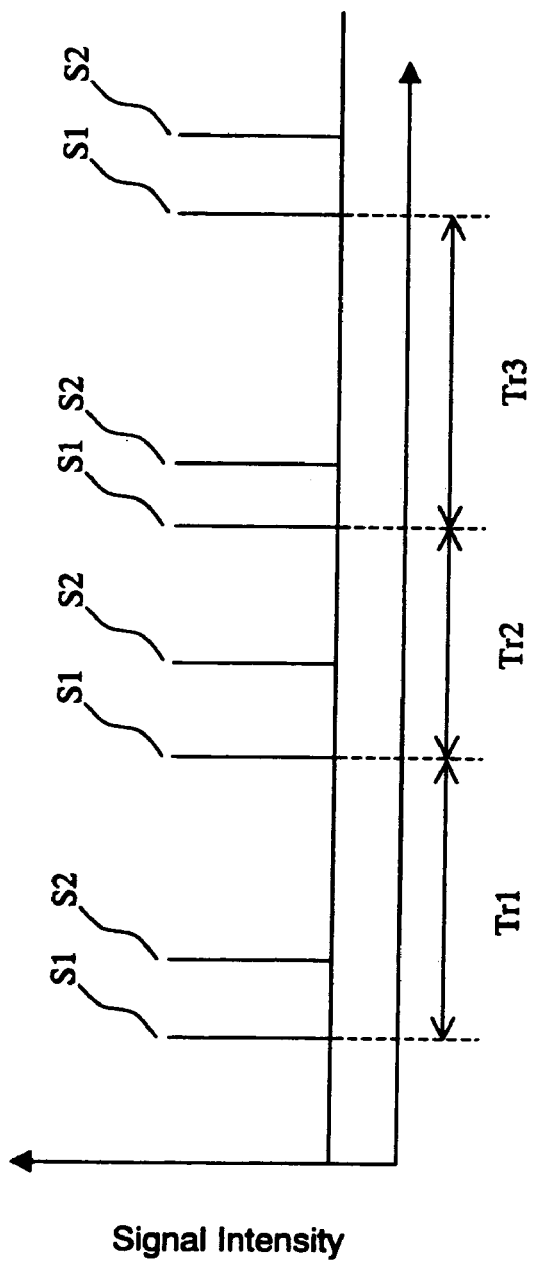
FIG. 11 is another timing chart of the pulse wave radar device according to the present invention.

FIG. 11 shows an example where each lapse of time is different from a moment of transmission of a transmitting pulse wave obtained by modulating one suite of a first transmitting pulse and a second transmitting pulse to a moment of transmission of a transmitting pulse wave obtained by modulating the next one suite of transmitting pulses. Tr1 represents a time interval between first transmitting pulse S1 of the first suite and first transmitting pulse S1 of the second suite, Tr2 represents a time interval between first transmitting pulse S1 of the second suite and first transmitting pulse S1 of the third suite, and Tr3 represents a time interval between first transmitting pulse S1 of the third suite and first transmitting pulse S1 of the fourth suite. If the time interval is different at least between the time-wise adjacent suites, it is possible to prevent mistakenly deciding, twice in a row, a pulse due to a noise to be a receiving pulse reflected from the target. Preferably, the time intervals may be different from each other.

If there is a target ahead of the pulse wave radar device of the present invention, a receiving pulse reflected from the target is detected when a constant lapse of time elapses after a transmitting pulse wave obtained by modulating a first transmitting pulse of the first suite is transmitted and another receiving pulse reflected from the target is received when the same lapse of time elapses after transmission of a transmitting pulse wave obtained by modulating a second transmitting pulse of the first suite. Further, a receiving pulse reflected from the target is detected when the same lapse of time elapses after a transmitting pulse wave obtained by modulating a first transmitting pulse of the second suite is transmitted and another receiving pulse reflected from the target is detected when the same lapse of time elapses after transmission of transmitting pulse wave obtained by modulating a second transmitting pulse of the second suite.

While on the other hand, if the pulse wave radar device in any other vehicle transmits pulse waves at an interval of Tr1 divided by an integer, even in a case where a pulse from the pulse wave radar device in this other vehicle is detected when the same lapse of time elapses after a transmitting pulse wave obtained by modulating a first transmitting pulse of the first suite is transmitted and then a transmitting pulse wave obtained by modulating a second transmitting pulse of the first suite, another pulse from the pulse wave radar device in this other vehicle is detected when a different lapse of time elapses after transmission of a transmitting pulse wave obtained by modulating the first transmitting pulse of the second suite. Accordingly, it is possible to decide that this pulse is caused by a noise, thereby preventing mistakenly deciding that it is a receiving pulse reflected from the target.

In this case, preferably a rule of majority based on a plurality of decision results may be employed or a round-trip propagation time or distance to the target may be output if the pulse is successively decided to be a receiving pulse reflected from the target.

It is to be noted that it is further effective if each time the transmitting circuit transmits a transmitting pulse wave obtained by modulating first and second transmitting pulses as one suite so that a time interval in occurrence between the first and second transmitting pulses is different, and also each time it transmits a transmitting pulse wave obtained by modulating first and second transmitting pulses as one suite and then transmits a transmitting pulse wave obtained by modulating the next suite of transmitting pulses so that a time interval in occurrence from transmission to the next transmission is different.

For example, if the pulse wave radar device in any other vehicle transmits pulse waves at an interval of Tr1 divided by an integer, a pulse from the pulse wave radar device in this other vehicle is detected when a different lapse of time elapses after transmission of a transmitting pulse wave obtained by modulating the first transmitting pulse of the second suite even if the pulse from the pulse wave radar device in this other vehicle is detected when the same lapse of time elapses after a transmitting pulse wave obtained by modulating a first transmitting pulse of the first suite is transmitted and then a transmitting pulse wave obtained by modulating a second transmitting pulse of the first suite, and also a pulse from the pulse wave radar device in this other vehicle is detected when another different lapse of time elapses after transmission of a transmitting pulse wave obtained by modulating the second transmitting pulse of the second suite. Accordingly, it is possible to decide that this pulse is caused by a noise, thereby preventing mistakenly deciding that it is a receiving pulse reflected from the target.

As a further countermeasure against the pulse wave radar device in any other vehicle transmitting a transmitting pulse wave periodically, it is effective if a lapse of time from a moment when the transmitting circuit transmits a transmitting pulse wave obtained by modulating one suite of a first transmitting pulse and a second transmitting pulse to a moment when it transmits a transmitting pulse wave obtained by modulating the next suite of transmitting pulses may not be an integral multiple of a lapse of time in occurrence between the first transmitting pulse and the second transmitting pulse.

Figure 12:
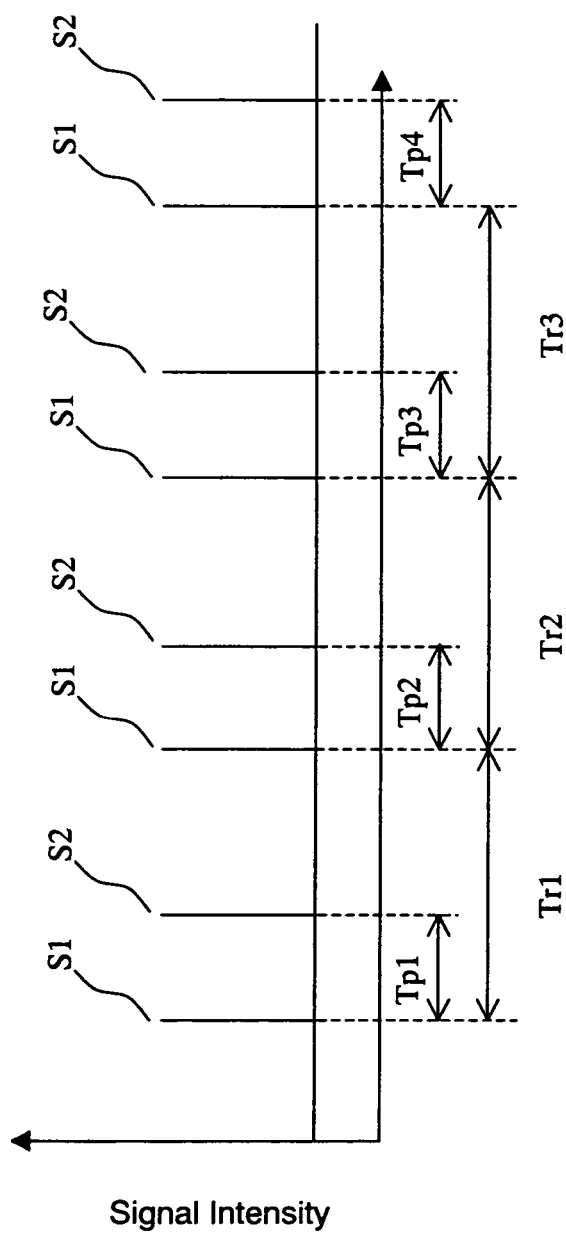
FIG. 12 is a further timing chart of the pulse wave radar device according to the present invention.

FIG. 12 shows an example where a lapse of time from transmission of a transmitting pulse wave obtained by one suite of a first transmitting pulse and a second transmitting pulse to transmission of a transmitting pulse obtained by modulating the next suite of transmitting pulses is not an integral multiple of a lapse of time in occurrence between the first and the second transmitting pulses. Tp1 represents a time interval between first transmitting pulse S1 and second transmitting pulse S2 of the first suite, Tp2 represents a time interval between first transmitting pulse S1 and second transmitting pulse S2 of the second suite, Tp3 represents a time interval between first transmitting pulse S1 and second transmitting pulse S2 of the third suite, and Tp4 represents a time interval between first transmitting pulse S1 and second transmitting pulse S2 of the fourth suite. Tr1 represents a time interval between first transmitting pulse S1 of the first suite and first transmitting pulse S1 of the second suite, Tr2 represents a time interval between first transmitting pulse S1 of the second suite and first transmitting pulse S1 of the third suite, and Tr3 represents a time interval between first transmitting pulse S1 of the third suite and first transmitting pulse S1 of the fourth suite.

If there is a target ahead of the pulse wave radar device of the present invention, a receiving pulse reflected from the target is detected when a constant lapse of time elapses after a transmitting pulse wave obtained by modulating the first transmitting pulse of the first suite is transmitted and another receiving pulse reflected from the target is received when the same lapse of time elapses after transmission of a transmitting pulse wave obtained by modulating the second transmitting pulse of the first suite. Further, a receiving pulse reflected from the target is detected when the same lapse of time elapses after a transmitting pulse wave obtained by modulating the first transmitting pulse of the second suite is transmitted and another receiving pulse reflected from the target is detected when the same lapse of time elapses after transmission of a transmitting pulse wave obtained by modulating the second transmitting pulse of the second suite.

While on the other hand, if the pulse wave radar device in any other vehicle transmits pulse waves at an interval of Tp1, even in a case where a pulse from the pulse wave radar device in this other vehicle is detected when the same lapse of time elapses after transmission of a transmitting pulse wave obtained by modulating the first transmitting pulse of the first suite and after transmission of a transmitting pulse wave obtained by modulating the second transmitting pulse of the first suite, another pulse from the pulse wave radar device in this other vehicle is detected when a different lapse of time elapses after transmission of a transmitting pulse wave obtained by modulating the first transmitting pulse of the second suite. As a result, it is possible to decide this pulse to be a pulse due to a noise, thereby preventing mistakenly deciding that it is a receiving pulse reflected from the target.

In this case, preferably a rule of majority based on a plurality of decision results may be employed or a round-trip propagation time or distance to the target may be output if the pulse is successively decided to be a receiving pulse reflected from the target.

As described above, by the present invention, it is possible to calculate a round-trip propagation time or a distance to a target without mistakenly deciding that a pulse even due to a noise having an irregular period is a receiving pulse reflected from the target.

A pulse wave radar device of the present invention can be applied as a vehicle-installed apparatus for the purpose of collision prevention or automatic cruising and also as a fixed pulse wave radar device.

What is claimed is:

1. A pulse wave radar device comprising:
   a transmitting circuit which modulates a first transmitting pulse and a second transmitting pulse which are separated in occurrence from each other by a predetermined time interval and transmits a transmitting pulse wave;
   a transmitting antenna which transmits the transmitting pulse wave transmitted from the transmitting circuit;
   a receiving antenna which receives a receiving pulse wave reflected from a target; and
   a receiving circuit which demodulates the receiving pulse wave from the receiving antenna and outputs a receiving pulse;
   wherein the transmitting circuit transmits a transmitting pulse wave obtained by modulating the first transmitting pulse and the second transmitting pulse as one suite, which corresponds to a predetermined pair of first and second transmitting pulses, so that a time interval between the first transmitting pulse and the second transmitting pulse of a first suite is different from a time interval between the first transmitting pulse and the second transmitting pulse of a subsequent suite, and a time interval between transmission of a transmitting pulse wave obtained by modulating the first transmitting pulse and the second transmitting pulse as one suite, via the transmitting circuit, and transmission of a transmitting pulse wave obtained by modulating a next suite of the transmitting pulses, via the transmitting circuit, is not an integral multiple of a time interval in occurrence between the first transmitting pulse and the second transmitting pulse.

2. The pulse wave radar device according to claim 1, wherein a time interval between the first transmitting pulse and second transmitting pulse of the first suite transmitted by the transmitting circuit is longer than a round-trip propagation time that corresponds to a maximum detectable distance.

3. A pulse wave radar device comprising:
   a transmitting circuit which modulates a first transmitting pulse and a second transmitting pulse which are separated in occurrence from each other by a predetermined time interval and transmits a transmitting pulse wave;
   a transmitting antenna which transmits the transmitting pulse wave transmitted from the transmitting circuit;
   a receiving antenna which receives a receiving pulse wave reflected from a target; and
   a receiving circuit which demodulates the receiving pulse wave from the receiving antenna and outputs a receiving pulse;
   wherein the transmitting circuit transmits a transmitting pulse wave obtained by modulating the first transmitting pulse and the second transmitting pulse as one suite, which corresponds to a predetermined pair of first and second transmitting pulses, sequentially, so that a time interval between the transmission of the transmitting pulse wave and the transmission of subsequent transmitting pulse wave is different each time, and a time interval between transmission of a transmitting pulse wave obtained by modulating the first transmitting pulse and the second transmitting pulse as one suite, via the transmitting circuit, and transmission of a transmitting pulse wave obtained by modulating a next suite of the transmitting pulses, via the transmitting circuit, is not an integral multiple of a time interval in occurrence between the first transmitting pulse and the second transmitting pulse.

4. The pulse wave radar device according to claim 3, wherein a time interval between the first transmitting pulse and second transmitting pulse of the first suite transmitted by the transmitting circuit is longer than a round-trip propagation time that corresponds to a maximum detectable distance.

* * * * *